United States Patent [19]
Foreman et al.

[11] Patent Number: 4,989,807
[45] Date of Patent: Feb. 5, 1991

[54] S-SHAPED JET ENGINE INLET DIFFUSER

[75] Inventors: Kenneth M. Foreman, Bellmore; Richard C. Jenkins, Smithtown, both of N.Y.

[73] Assignee: Grumman Aerospace Corporation, Bethpage, N.Y.

[21] Appl. No.: 421,312

[22] Filed: Oct. 13, 1989

Related U.S. Application Data

[63] Continuation of Ser. No. 178,931, Apr. 7, 1988, abandoned.

[51] Int. Cl.$^5$ .............................................. B64D 33/02
[52] U.S. Cl. ..................................... 244/53 B; 138/39
[58] Field of Search ...................... 244/53 B, 207, 208, 244/209; 138/39; 137/15.1, 15.2

[56] References Cited

U.S. PATENT DOCUMENTS

| | | |
|---|---|---|
| 1,837,901 | 12/1931 | Fottinger et al. . |
| 2,037,940 | 4/1936 | Stalker . |
| 2,477,637 | 8/1949 | Mercier ............................ 244/53 B |
| 2,503,973 | 4/1950 | Smith ................................ 244/53 B |
| 2,590,797 | 3/1952 | Siciliano . |
| 2,696,075 | 12/1954 | Griffith ............................. 244/53 B |
| 2,721,715 | 10/1955 | Hoadley . |
| 2,788,719 | 4/1957 | Bennett . |
| 2,841,182 | 7/1958 | Scala . |
| 2,948,148 | 8/1960 | d'Anfreville et al. . |
| 2,968,921 | 1/1961 | David . |
| 3,000,178 | 9/1961 | Logerot . |
| 3,212,515 | 10/1965 | Zisfein et al. . |
| 3,216,455 | 11/1965 | Cornell et al. . |
| 3,353,562 | 11/1967 | Heskestad . |
| 3,396,738 | 8/1968 | Heskestad . |
| 3,490,236 | 1/1970 | Markowski . |
| 3,494,379 | 2/1970 | Hinden . |
| 3,508,561 | 4/1970 | Cornish, III . |
| 4,098,073 | 7/1978 | Adkins et al. . |
| 4,214,722 | 7/1980 | Tamura ............................... 244/207 |
| 4,275,857 | 6/1981 | Bergsten ............................ 244/53 B |
| 4,296,900 | 10/1981 | Krall ................................... 244/207 |
| 4,749,151 | 6/1988 | Ball et al. .......................... 244/207 |

FOREIGN PATENT DOCUMENTS

| | | |
|---|---|---|
| 969293 | 12/1950 | France . |
| 1006146 | 4/1952 | France . |
| 141488 | 5/1961 | U.S.S.R. . |
| 1399606 | 7/1975 | United Kingdom ............... 244/53 B |

Primary Examiner—Galen Barefoot
Attorney, Agent, or Firm—Pollock, VandeSande & Priddy

[57] ABSTRACT

A horizontal inlet section of a jet engine diffuser extends to a transitional curved section which, in turn, extends to a horizontal outlet section offset from the horizontal inlet section to shield observation of infrared and microwave signals from a downstream jet engine. A vane between the inlet and transitional curved sections further shields the observable signals and deflects inlet airflow against the interior wall of the diffuser for minimizing separation of boundary layer airflow from the wall. A backward facing slot is formed in the wall transversely adjacent the vane for effecting low energy boundary airflow to further minimize boundary layer airflow separation.

3 Claims, 1 Drawing Sheet

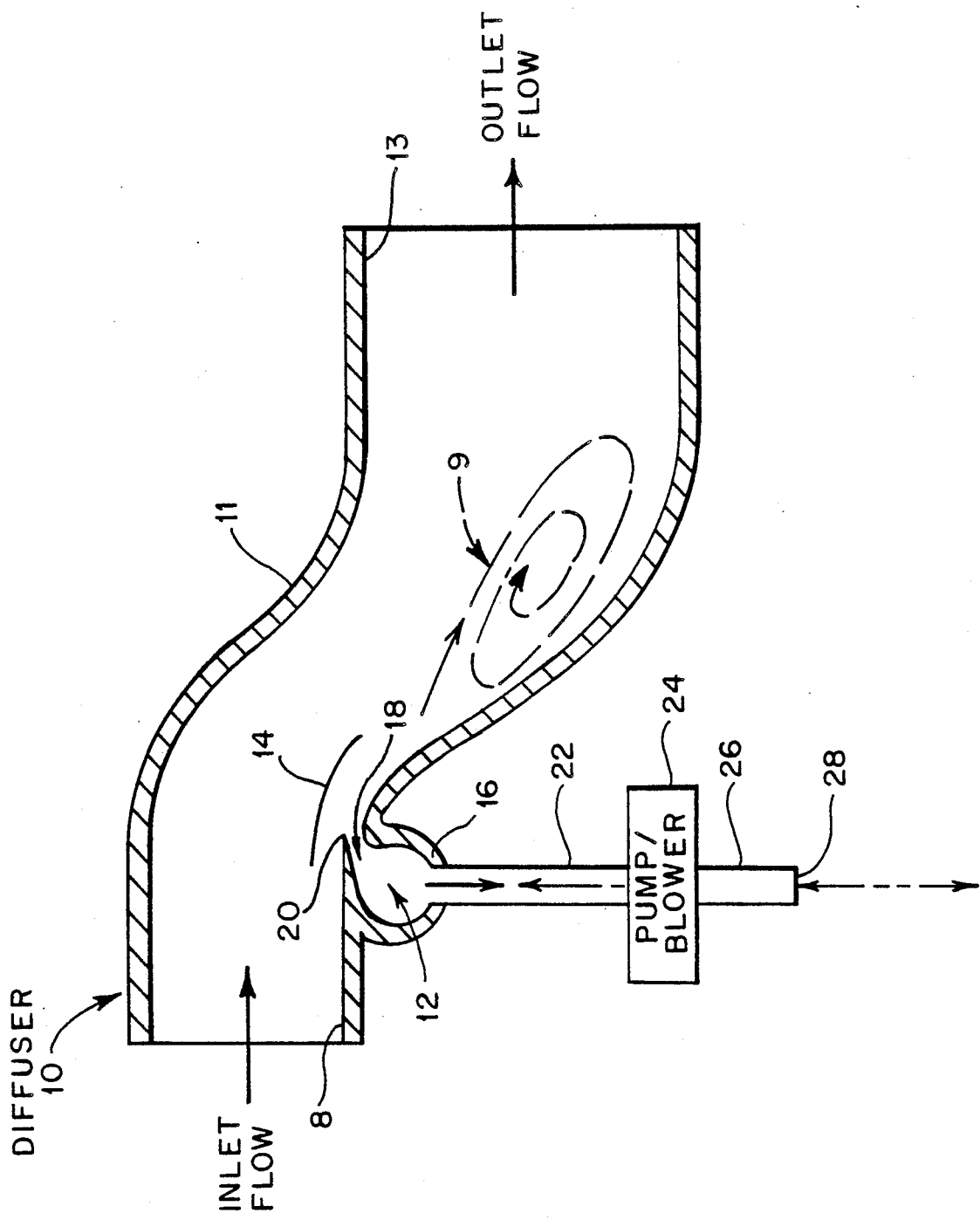

S-SHAPED JET ENGINE INLET DIFFUSER

This application is a continuation, of application Ser. No. 07/178,931, filed Apr. 7, 1988 now abandoned.

FIELD OF THE INVENTION

The present invention relates to jet engine inlet diffusers, and more particularly to such a diffuser having a compact S-shaped configuration.

BACKGROUND OF THE INVENTION

The air intake ducts for a modern jet aircraft are structurally preceded with a diffuser that reduces air velocity entering a jet engine compressor intake so that the engine thrust is maximized. For military aircraft it is well known that, for forward sector engagement, the inlet for the aircraft's propulsion system contributes to a high radar cross section signature which is easily detectable. In addition, fore and aft visible "hot spots" produced by propulsive machinery can provide bright targets for heat-seeking missiles. Thus, there is a need for drastic reduction of infrared emission and radar cross section for the aircraft inlet and engine nozzle.

One of the instinctive methods to minimize the infrared emissions and microwave reflections of aircraft propulsive inlets is to introduce considerable offset between the centerlines of the entry and exit, thereby creating an elongated S-shaped diffuser. Other methods are to design the air inlet as narrow, high aspect ratio lenticular slits or apertures that conform to the external structural surfaces of the aircraft.

However, these techniques may lead to nonuniform flow profiles (i.e., flow "quality") and inadequate ram air pressure recovery at the compressor inlet station. The air supply needs of the engine throughout the flight envelope pose consideration of innovative fluid dynamical solutions for both aspects of the overall problems, i.e., reduced observables and adequate propulsion performance to perform and survive a military mission.

BRIEF DESCRIPTION OF THE INVENTION

In the present invention an S-shaped diffuser exhibits a centerline offset which may be equated with low-observable infrared and microwave signals. In a divergent portion of the present diffuser, where kinetic energy of ram air is converted into a pressure field, a vane and an adjacently situated positive or negative pressure slot minimizes adverse pressure gradients which could otherwise encourage the internal flow boundary layers to separate from the interior diffuser walls, which would result in poor quality airflow profiles.

Accordingly, the present invention offers a diffuser design, particularly suited for military aircraft, which promotes low observable signatures for the aircraft while maximizing the thrust capability of the aircraft jet engines.

BRIEF DESCRIPTION OF THE FIGURE

The above-mentioned objects and advantages of the present invention will be more clearly understood when considered in conjunction with the accompanying drawing, in which:

The figure is a diagrammatic cross-sectional view of the present diffuser configuration.

DETAILED DESCRIPTION OF THE INVENTION

Reference numeral 10 generally indicates the compact S-shaped jet engine inlet diffuser constituting the present invention. Flow at the inlet 8 of the diffuser initially travels in a horizontal direction and then undergoes a redirection along an intermediately situated bend 11. The bend section has a gradually increasing cross-sectional area as compared with the inlet. The flow then undergoes another redirection in a horizontal path at the outlet end 13 of the diffuser. At the outlet, the cross-sectional area is increased as compared with the intermediate bend 11 and inlet 8 to preserve a continually increasing area ratio to minimize the pressure drop across the diffuser, which consequently minimizes the effect of the diffuser on thrust developed by a jet engine. Although the figure is simplified for easy comprehension, the outlet flow from the diffuser is maintained in coaxial proximity with a compressor intake of the jet engine (not shown).

Without the means of the present invention, to be shortly described, in the interior passage of the diffuser where kinetic energy of ram air is converted into a pressure field, the adverse pressure gradients are more likely to separate the internal flow from the duct walls causing recirculation of air in zone 9 which results in an uneven pressure across the outlet end 13. A loss of pressure or uneven pressure resulting from such recirculation is transferred across the compressor blades of the jet engine (not shown), which could result in dangerous stall or turbulence. It is again noted for the reader that the offset or S-shaped configuration of the diffuser is relied upon; notwithstanding these inherent problems, because the offset offers blocking or shielding of infrared and microwave observable signals developed from the jet engine. Further, the offset design of the diffuser enables an aircraft engine to be mounted within the aircraft airframe, which makes it less susceptible to damage by ordnance fired from an enemy military aircraft.

In order to minimize the problems discussed with an offset diffuser, the present invention utilizes a vane 14, which is maintained below or at the centerline of the diffuser and in the area of transition between the horizontally oriented inlet end 8 and the intermediate bend 11. When positioned in the outlined area, the vane helps airflow negotiate the bend in the diffuser thereby improving exit flow and minimizing the separation of the airflow from the lower wall of the diffuser. In addition, the presence of the vane in the outlined region serves as a shield for infrared and microwave observables from the downstream jet engine components. The vane is preferably contoured to approximate the bend of the intermediate bend 11 and may be either a single or multiple vane assembly.

To increase the efficiency of the present diffuser, a source of suction or positive air is introduced to the interior of the diffuser at a point 12 adjacent the vane 14. In a preferred embodiment of the present invention, suction is introduced into the diffuser through a rearwardly facing slot 18 positioned in confronting relationship with the underside of vane 14. The slot is formed in the lower wall portion of the diffuser and is characterized by an overhanging sharp-edged lip 20. The slot communicates with a cylindrical or spherical duct 16. The duct communicates with a conduit 22, which introduces suction via a pump 24. The pump exhausts suctioned air from the diffuser through an exhaust port 28.

In the case of suction, it is believed that the arcuate backward-facing slot 18 removes low energy air along the lower diffuser wall thereby preventing degrading effects of its presence in a zone such as 9. In certain applications it may be possible to replace the pump with a blower to introduce a positive flow of air through slot 18 and energize the low energy boundary layer against the wall of the diffuser which can also have the effect of minimizing a poor quality airflow profile such as would occur in zone 9.

The combination of vane 14 and backward-facing slot 18 is believed to be a synergistic combination since they conceivably work together to accelerate the flow of air past the slot and maintain contact between the interior wall of the diffuser and the boundary layers of the airflow. The flow near slot 18 undergoes almost a 180 degree reversal in direction, which redirects part of the flow toward the lower diffuser wall.

Accordingly, the present invention offers a number of advantages in jet aircraft design including high quality airflow profiles to maximize jet engine performance while simultaneously suppressing infrared and microwave observable signals from the engine. In addition, the offset S-shaped compact diffuser of the present invention increases the flexibility of aircraft design, namely, widening the possibilities of mounting a jet engine within the aircraft frame while the diffusers are mounted outboard and capable of delivering low velocity airflow to the engine. This enclosed location of the engines would decrease the vulnerability of the engines to damage during a military mission. As a result, pilot safety can be greatly increased.

It should be understood that the invention is not limited to the exact details of construction shown and described herein for obvious modifications will occur to persons skilled in the art.

We claim:

1. A diffuser for a jet engine comprising:
   a straight inlet section;
   a straight outlet section located in parallel spaced relation to the inlet section and having an increased cross-sectional area compared therewith;
   a curved median section intermediately communicating between the inlet and outlet sections and having a gradually increasing cross-sectional area between inlet and outlet ends thereof;
   a solid, thin vane located at a junction between the inlet and median sections for directing airflow against the interior wall of the median section thereby assisting in minimizing the separation of boundary layer airflow along the interior wall which increases the efficiency of the diffuser and shields, along with offset inlet and outlet sections, observable signals from the engine; and
   a slot that is backward-facing relative to the direction of inlet airflow, the slot transversely located adjacent to the vane for disturbing low energy boundary layer air flowing thereacross so as to further minimize the separation of boundary layer airflow along the interior wall thereby increasing the efficiency of the diffuser, the slot including
   (a) a cylindrical upstream surface terminating in a sharp-edge lip; and
   (b) a convex smooth downstream surface.

2. The structure set forth in claim 1 together with means for applying suction pressure to the slot thereby evacuating a substantial portion of the low energy boundary layer of air flowing across the slot.

3. The structure set forth in claim 1 together with means for applying positive pressure to the slot for accelerating the low energy boundary layer of air flowing across the slot.

* * * * *